US007461760B2

(12) United States Patent  (10) Patent No.: US 7,461,760 B2
Ferguson et al.  (45) Date of Patent: Dec. 9, 2008

(54) BATTERY DISPENSER AND REFILL

(75) Inventors: Mark A. Ferguson, Memphis, NY (US); Todd B. Abernethy, Skaneateles, NY (US); Jon Gauthier, Bennington, VT (US); John M. Dupnik, Shaftsbury, VT (US)

(73) Assignee: Eveready Battery Company, Inc., St. Louis, MO (US)

( * ) Notice: Subject to any disclaimer, the term of this patent is extended or adjusted under 35 U.S.C. 154(b) by 466 days.

(21) Appl. No.: 11/219,556

(22) Filed: Sep. 2, 2005

(65) Prior Publication Data

US 2006/0091150 A1  May 4, 2006

Related U.S. Application Data

(63) Continuation-in-part of application No. 10/977,224, filed on Oct. 29, 2004, now Pat. No. 7,232,041.

(51) Int. Cl.
B65H 31/20 (2006.01)

(52) U.S. Cl. .................. 221/242; 221/113; 221/239; 221/241; 221/243; 221/246; 221/255; 221/260; 221/287; 221/304

(58) Field of Classification Search ............... 221/304, 221/239, 241, 242, 243, 246, 255, 260, 287, 221/113

See application file for complete search history.

(56) References Cited

U.S. PATENT DOCUMENTS

| 3,437,236 | A |  | 4/1969 | Huck ........................... 221/86 |
| 3,800,940 | A |  | 4/1974 | Thomas ......................... 206/42 |
| 3,869,066 | A |  | 3/1975 | Ferraro .......................... 221/102 |
| 3,995,767 | A | * | 12/1976 | Brindley et al. ................ 221/82 |
| 4,209,091 | A |  | 6/1980 | Lieberman ..................... 206/333 |
| 4,369,885 | A |  | 1/1983 | Redmond ...................... 206/484 |
| 4,953,700 | A |  | 9/1990 | DeDino ......................... 206/333 |
| 5,570,810 | A |  | 11/1996 | Lambelet, Jr. et al. ......... 221/86 |
| 6,039,185 | A |  | 3/2000 | Pedracine et al. ............. 206/704 |
| 6,488,176 | B2 |  | 12/2002 | Garrant et al. ................. 221/79 |
| 6,631,825 | B2 | * | 10/2003 | Garrant et al. ................. 221/79 |
| RE38,368 | E |  | 12/2003 | Bishop et al. ................. 221/197 |
| 6,749,085 | B2 |  | 6/2004 | Garrant et al. ................. 221/80 |
| 6,769,567 | B2 | * | 8/2004 | Gauthier et al. ............... 221/79 |
| 2002/0030062 | A1 |  | 3/2002 | Garrant et al. |

FOREIGN PATENT DOCUMENTS

CA  2 247 746 A1  3/2000
GB  2 116 153 A  9/1983

* cited by examiner

Primary Examiner—Gene Crawford
Assistant Examiner—Timothy R Waggoner
(74) Attorney, Agent, or Firm—Russell H. Toye, Jr.

(57) ABSTRACT

A battery dispenser and a refill for a battery dispenser are provided. In one embodiment the battery dispenser includes a disk that supports a plurality of batteries, a cover that has an opening, a grip ring that rotates the disk to align the batteries with the opening of the cover, and a push element capable of advancing batteries from inside the cover to a landing external to the cover. The disk rotates relative to the grip ring between a load position and a dispensing position, and the disk is removable from the grip ring when the disk is in the load position.

32 Claims, 4 Drawing Sheets

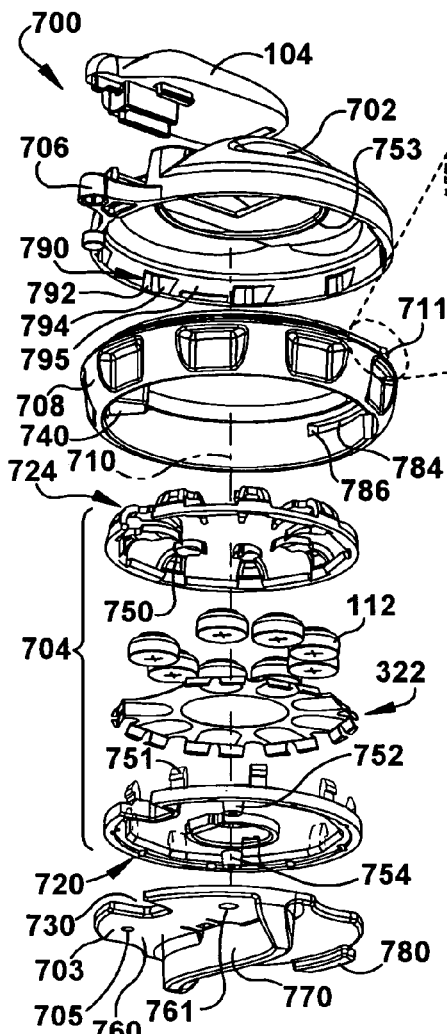
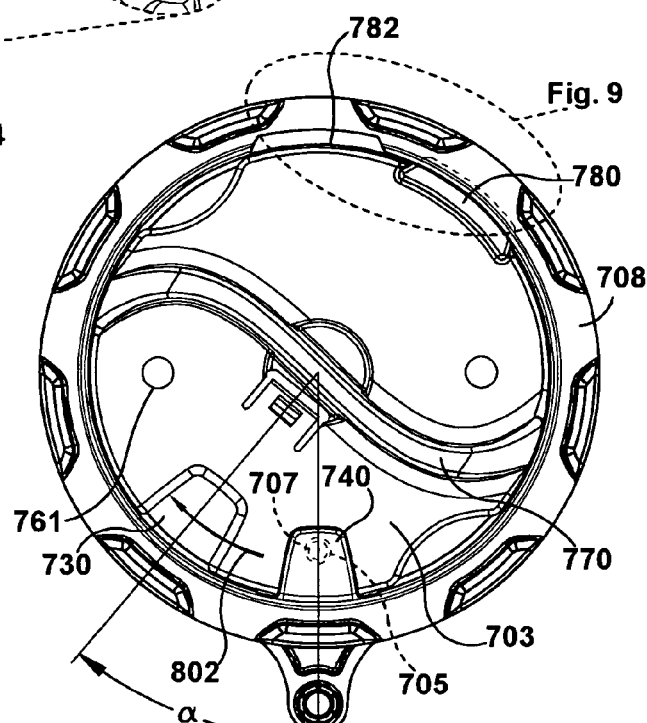
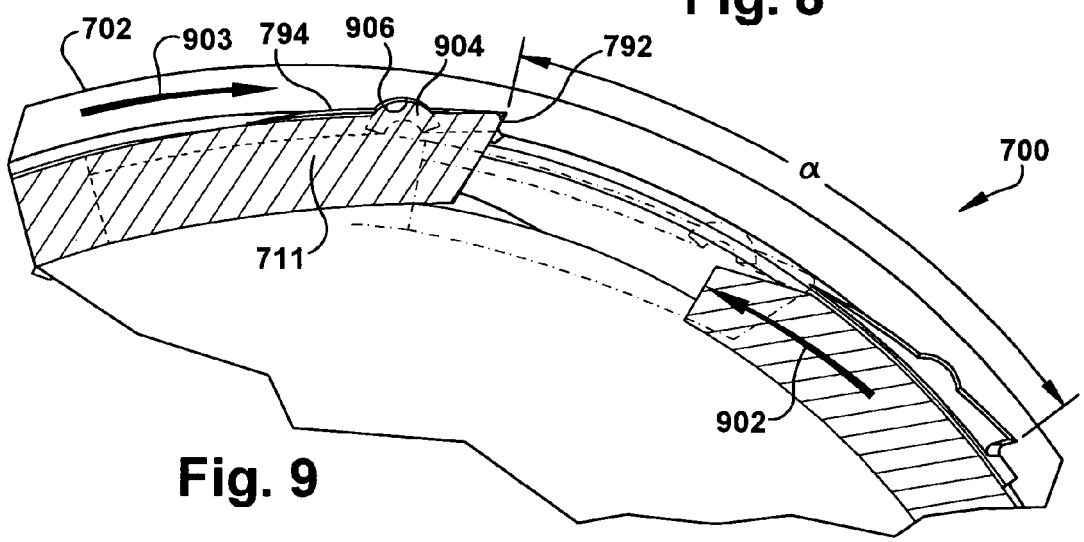

BATTERY DISPENSER AND REFILL

CROSS-REFERENCE TO RELATED APPLICATIONS

This application is a continuation-in-part of U.S. patent application Ser. No. 10/977,224, filed Oct. 29, 2004 now U.S. Pat. No. 7,232,041, entitled Battery Dispenser and Refill, currently pending, the entire disclosure of which is incorporated herein by reference.

BACKGROUND

The present invention relates to a battery dispenser for housing and dispensing batteries. The invention also relates to a refill containing batteries that can be inserted and removed from the battery dispenser.

Button cell batteries, which can be used to operate small devices such as hearing aids, for example, can be difficult to remove from their packaging and to insert into a device in a proper orientation because of their small size. Metal-air button cell batteries, for example, are activated upon contact with oxygen, and therefore have a tab system that covers an air entry port of the metal-air cell prior to use. The tab system functions to limit the transport of water vapor in or out of the cell and limits the ingress of air into the cell sufficient to activate the battery until such time as the cell is placed into service. Therefore when the batteries are removed from the dispenser the tab system is removed and the ports are exposed to the oxygen of the ambient environment, thereby enabling the cell to be activated. The handling of these batteries in removing them from the battery dispenser, removing the tab system, and inserting the batteries into the a device can be difficult, especially in the event a user suffers from reduced dexterity, poor vision or another physical infirmity.

Efforts to address some of these issues are found in the art. U.S. Pat. No. 6,631,825 B1, hereby incorporated by reference, which discloses a battery dispenser that enables the user to remove product from a battery dispenser without having to handle the product at any point during the dispensing process or during a process which inserts the battery in an end use device.

U.S. Pat. No. 6,581,799 B1, hereby incorporated by reference, discloses a battery dispenser in which the cover and base are rotatable with respect to each other about a common axis and the user can attach a refill base after removal of a spent base. However, once the cover and base are closed, the cover and base can become inadvertently separated during rotation of the cover during dispensing of the batteries.

None of the above references, however, allow for new product to be inserted into the battery dispenser while also providing a mechanism that ensures batteries are secure inside the dispenser during dispensing.

SUMMARY

The present invention provides for a battery dispenser for containing and dispensing batteries and a refill for the replacement of batteries in the battery dispenser.

In one embodiment the battery dispenser includes a disk that supports a plurality of batteries, a grip ring, a cover that that can be rotated relative to the grip ring to align the batteries with an opening of the cover, and a push element capable of advancing batteries from inside the cover to a landing external to the cover. The disk rotates relative to the grip ring between a load position and a dispensing position, and the disk is removable from the grip ring when the disk is in the load position.

In another embodiment the disk and the grip ring cooperate to restrict rotation of the disk about the axis relative to the grip ring. The disk can also include a handle that cooperates with the grip ring to restrict the rotation of the disk relative to the grip ring so that the rotation of the disk and the grip ring coincide while the batteries are advanced in alignment with the opening of the cover during dispensing.

In another embodiment a refill that can be inserted into the battery dispenser includes a plurality of batteries supported by a base at a plurality of battery positions and a retainer for securing the batteries to the base. The base also includes an opening that mates with a key to the dispenser. The refill optionally includes an adhesive platform disposed between the base and the batteries to secure the batteries. In another embodiment the base of the refill includes an extended wall that cooperates with dispenser during loading of the refill in the dispenser.

In another embodiment a battery dispenser includes a cover that has an opening, a grip ring that aligns batteries with the opening of the cover, a push element capable of advancing batteries from inside the cover to a landing external to the cover, a refill comprising a base and a plurality of batteries, and a disk that rotates relative to the grip ring between a load position and a dispensing position. The disk is removable from the grip ring when the disk is in the load position. In another embodiment the disk is the base of the refill that supports the batteries and the disk and the grip ring cooperate to restrict rotation of the disk relative to the grip ring about an axis.

BRIEF DESCRIPTION OF THE DRAWINGS

The example embodiments of the present invention can be understood with reference to the following drawings. The components in the drawings are not necessarily to scale. Also, in the drawings, like reference numerals designate corresponding parts throughout the several views.

FIG. 7 is an exploded view of the battery dispenser and refill according to another embodiment of the invention;

FIG. 8 is a bottom view of the battery dispenser of FIG. 7 showing the bottom disk turned from the load position to the dispensing position according to an embodiment of the invention;

FIG. 9 is close-up view of a portion of the battery dispenser of FIG. 8 showing cooperation between the grip ring and the cover according to an embodiment of the invention;

DETAILED DESCRIPTION

Figure 1:
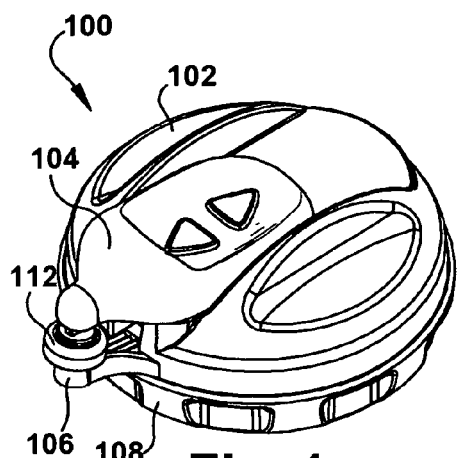
FIG. 1 is a perspective view of a battery dispenser according to an embodiment of the invention.

FIG. 1 is a perspective view of a battery dispenser 100 according to an embodiment of the invention. Battery dispenser 100 includes a cover 102, a push element 104, a landing 106, and a grip ring 108. FIG. 1 shows a battery 112 which has been advanced from inside the battery dispenser 100 to the landing 106.

Figure 2:
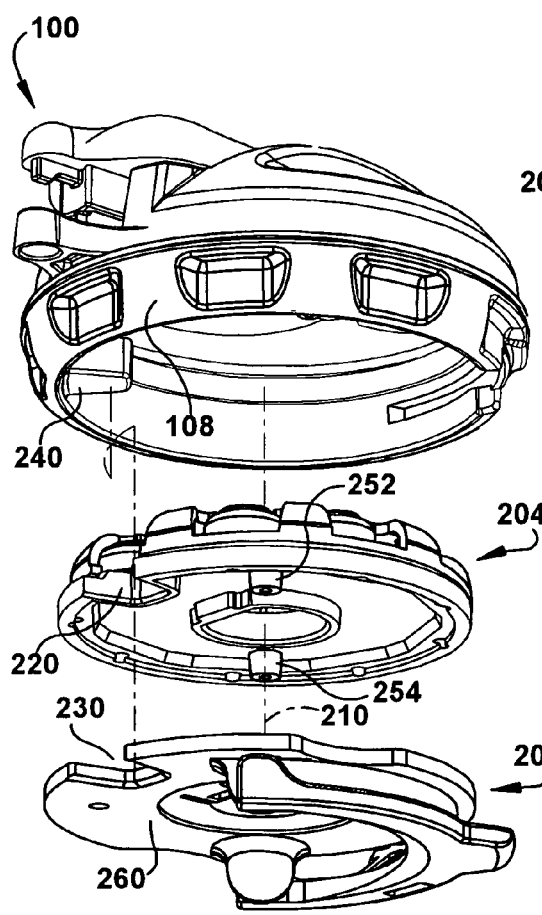
FIG. 2 is an exploded view of the battery dispenser of FIG. 1 with a bottom disk removed from the grip ring to accommodate a refill loaded into the dispenser according to an embodiment of the invention.

FIG. 2 is an exploded view of the battery dispenser 100 of FIG. 1 with a bottom disk 203 removed from grip ring 108 to accommodate a refill 204 loaded into the dispenser. When the battery dispenser 100 is empty or no longer contains batteries 112, a refill 204 containing a new supply of batteries 112 can be loaded into the battery dispenser 100. In one embodiment the disk 203 rotates relative to the grip ring 108 about an axis 210 from a load position in which a refill 204 may be loaded or unloaded, to a dispensing position in which batteries 112 can be dispensed. The refill 204 and the disk 203 have openings, for example horse-shoe shaped openings 220 and 230, respectively, which align with the key 240 of grip ring 108 when the disk 203 is in the load position. The disk 203 can then be placed within the grip ring 108 and the battery dispenser 100 can be closed by rotating the disk 203 relative to the grip ring 108 about axis 210 to a dispensing position prior to dispensing batteries 112. Similarly, the battery dispenser 100 can be opened by rotating the disk 203 in the opposite direction and pulling the disk away from the grip ring 108.

Figure 3:
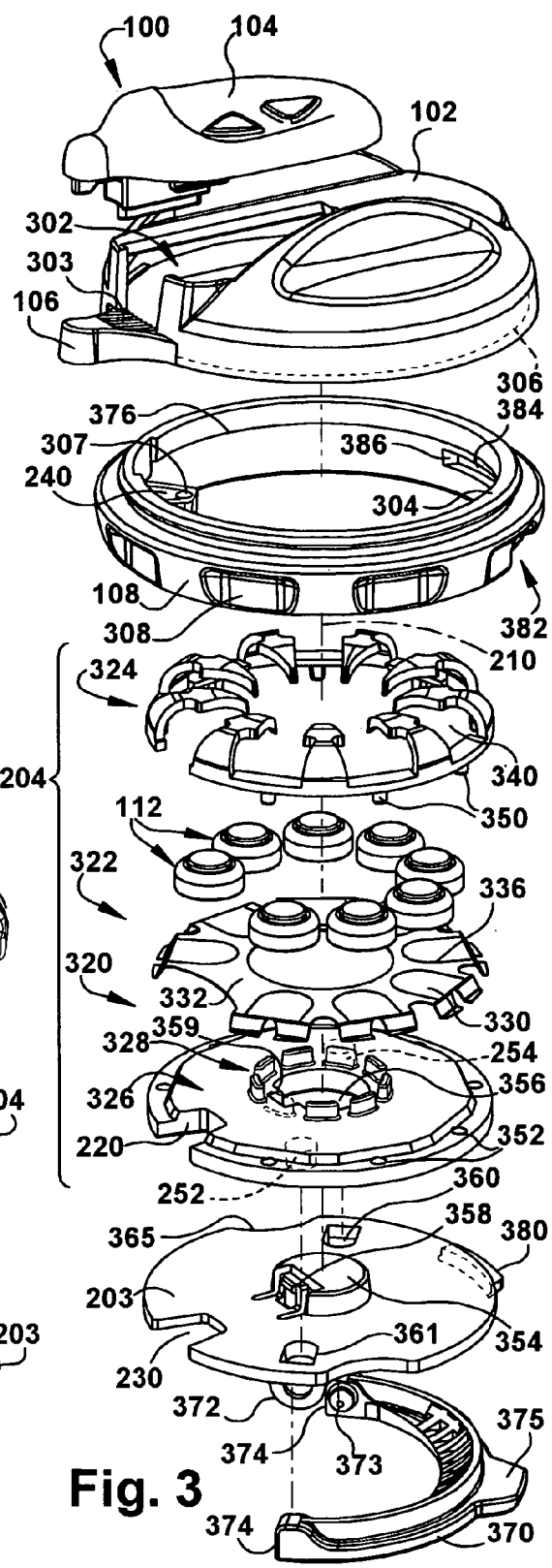
FIG. 3 is an exploded view of the battery dispenser and refill of FIG. 2 according to an embodiment of the invention.

FIG. 3 is an exploded view of the battery dispenser 100 and refill 204 of FIG. 2 according to an embodiment of the invention. The cover 102 defines the opening 302 along which the push element 104 moves in opposing directions between fully retracted, or open, and fully extended, or closed, positions to dispense the batteries 112. The landing 106 supports a battery 112 that is moved through opening 302 just prior to installation of the battery 112 into an electronic device. The landing 106 is shown integral to cover 102, however, the landing 106 can be connected, directly or indirectly, to grip ring 108. The grip ring 108 has a flange 304 that snap fits to an inwardly extending lip 306 (shown in phantom) that can be continuous or intermittent along the peripheral edge of the cover 102 to connect the grip ring 108 to the cover 102. The cover 102 and grip ring 108 can be made to rotate relative to one another about the axis 210 to expose a battery via opening 302 to dispense batteries. The key 240 of grip ring 108 can include a protrusion 307 that mates with a portion of disk 203 when it is placed in the dispensing position. The peripheral surface of the grip ring 108 can have dimples 308, or can be otherwise textured to improve the grip by the user to facilitate rotation of cover 102 relative to the grip ring 108.

The refill 204 includes a base 320 that supports a plurality of batteries 112, an adhesive platform 322 that secures the batteries 112 to the base 320, and a retainer 324 that connects to the base 320. The base 320 includes a deck 326 that surrounds a turret partition 328 onto which the plurality of batteries 112 can be mounted. The base 320 can be sized so that the deck 326 has a large enough surface area to accommodate a desired number of batteries. The turret partition 328, which includes evenly spaced turrets 356, cooperates with the push element 104 to allow or prevent rotation of the cover 102 and the base 320 relative to one another. For example, the push element 104 and the turret partition 328 can cooperate by allowing the cover 102 and the base 320 to rotate relative to one another when the push element 104 is inside the turret partition 328 to align a battery 112 with the opening 302 of the cover 104 for dispensing, and by preventing rotation of the cover 102 relative to the base 320 when the push element 104 is extended between the turrets.

The adhesive platform 322 is disposed on the deck 326 for securing the batteries 112 to the base 320. The adhesive platform 322 can be pre-cut, for example, adhesive platform 322 is shown having a plurality of U-shaped die cuts 336 at the plurality of battery positions 330. There is at least one empty position 332 reserved for the push element 104 when it is in the fully extended, or closed position, when the refill 204 and disk 203 are in the load position and prior to dispensing any of the batteries 112. The batteries 112 can include but are not limited to button cell batteries, such as metal-air cells, for example, zinc-air cells.

The metal-air cells become activated upon exposure to air upon release from adhesive platform 322. The retainer 324 holds down the batteries 112 against the base 320 and prevents the batteries 112 from dislodging due to vibration or dropping during shipping or handling. The compressive force on the batteries 112 helps ensure that they remain in position until dispensed. In addition, compression of the adhesive platform 322 can maintain a better seal between the batteries 112 and the base 320 to effectively limit ingress of air into air entry ports of a metal-air cell to avoid premature full activation.

The retainer 324 defines a plurality of openings 340 that coincide with the battery positions 330. FIG. 3 shows the retainer 324 having nine openings 340, with the base 320 accommodating up to and including eight batteries 112 at eight battery positions 330, and one empty position 332, which can be occupied by the push element 104 when the battery dispenser 100 is closed. The openings 340 of the retainer 324 allow the push element 104 to remain extended in the closed position when the refill 204 is being loaded or removed. The push element 104 is also free to move between the fully retracted and fully extended positions to dispense the batteries 112 one at a time. The retainer 324 also functions to prevent rotation of the grip ring 108 and base 320 relative to the cover 102 under certain conditions, unless the push element 104 is moved inside the perimeter of the turret partition 328, for example when push element 104 is in the fully retracted position which will be described in further detail.

The retainer 324 has a plurality of posts 350 that connect to the plurality of openings 352 in base 320, for example, via heat staking, ultrasonic welding, and other methods known to those of ordinary skill in the art. In an alternative embodiment, the retainer 324 can be integral with the base 320. For example, the retainer 324 can include at least one flexible portion (not shown), for example, a flexible portion that has relatively thinner wall section, or a hinge, that can be flexed open to allow insertion of batteries 112 between retainer 324 and base 320 and closed to apply a compressive force on the batteries 112 against the base 320.

In another embodiment disk 203 includes a snap connector 354 for mounting to base 320 of refill 204. The snap connector 354 can be shaped to ensure a single orientation of the disk 203 relative to the base 320 when connected. For example, alignment of the detent 358 on the snap connector 354 and the notch 359 in the flat section of the central opening 356 of the base 320 can ensure that horseshoe shaped openings 230 and 220 of the disk 203 and base 320, respectively, align with the key 240 of the grip ring 108 when the disk 203 is in the load position. When the base 320 and disk 203 are snap-fitted together, the downwardly extending protrusions 252, 254 (FIG. 2) of base 320 fit into openings 361, 360, of the disk 203 and the rotation of the base 320 coincides with the rotation of disk 203. When the base 320 and refill 204 are removed from disk 203 the detent 358 on the side of the snap connector 354 is depressed, and the recesses 365 along the peripheral edge of disk 203 allow the user to grab the base 320 to separate the two.

The disk 203 also includes a handle 370 that extends from the external surface 260 (FIG. 2) of the disk 203 and can be used both to rotate the disk 203 about axis 210 within the battery dispenser 100 and to remove or insert the disk 203 along axis 210 to replace the batteries 112. The external surface 260 of the disk 203 also includes downwardly extending sockets 372 to receive the knobs 373 of handle 370. The handle is shown in a folded position against the external surface 260 (FIG. 2) of the disk 203 and can swing downward away from the bottom surface 260 of the disk 203. The handle 370 can be shaped to further include flat edges 374 which limit the rotation of the handle 370 to about 90 degrees or less, such that the handle 370 can swing from a folded-down position against the external surface 260 of the disk 203 to a vertical position perpendicular to the external surface 260 of the disk 203.

To load the refill 204 into battery dispenser 100 the base 320 of refill 204 and the disk 203 are oriented with respect to the grip ring 108 so the horseshoe openings 230, 220, of the disk 203 and base 320, respectively, align with the key 240 of the grip ring 108. The refill 204 and disk 203 can be moved upwardly along axis 210 past the key 240 of grip ring 108 until the top surface of the base 320 comes into contact with the circumferential ledge 376 on the inside surface of the central opening in the grip ring 108. As the disk 203 is loaded into the grip ring 108, a projection 380 from the peripheral edge of the disk 203 fits into a notch 382 in the grip ring 108.

As the refill 204 is rotated into the dispensing position, its periphery is moved into the gap between the top surface of the key 240 and the adjacent lower surface of the circumferential ledge 376.

Once the refill 204 and disk 203 are loaded into the battery dispenser 100, the disk 203 can cooperate with the grip ring 108 to restrict the rotation of the disk 203 relative to the grip ring 108 about axis 210. The disk 203 can be rotated from the load position such that the projection 380 from the edge of the disk 203 slides within a groove 384 extending from the notch 382 along a portion of the inner circumference of grip ring 108 until the projection 380 contacts stop wall 386 at the end of the groove 384, where the disk 203 is in the dispensing position.

Figure 4:
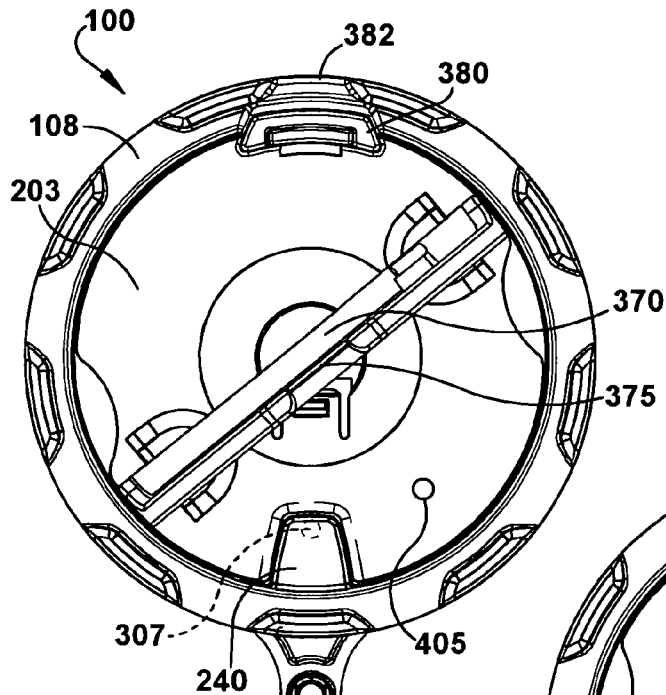
FIG. 4 is a bottom view of the battery dispenser of FIG. 1 showing the bottom disk in the load position according to an embodiment of the invention.
Figure 5:
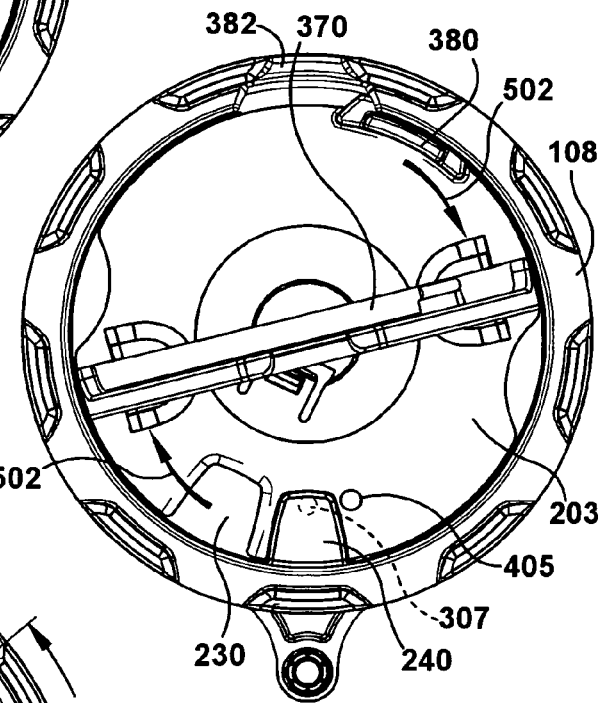
FIG. 5 is a bottom view of the battery dispenser of FIG. 1 showing the bottom disk between the load position and the dispensing position according to an embodiment of the invention.
Figure 6:
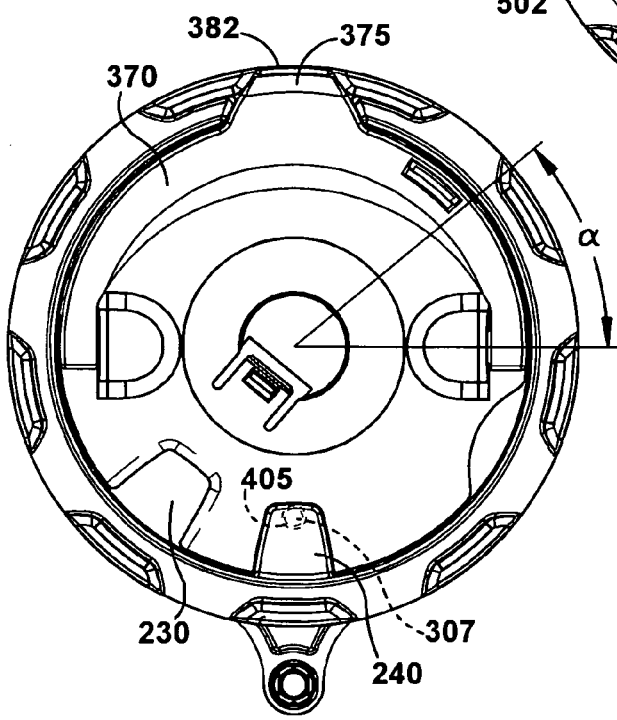
FIG. 6 is a bottom view of the battery dispenser of FIG. 1 showing the disk in the dispensing position according to an embodiment of the invention.

FIGS. 4-6 show a bottom view of battery dispenser 100 and disk 203 as it rotates from the load position to a dispensing position according to an embodiment of the invention. FIG. 4 shows that when the disk 203 is in the load position the horseshoe opening 230 of disk 203 is aligned with the key 240 of the grip ring 108, and the projection 380 from the edge of the disk 203 resides within the notch 382 in the grip ring 108. The end of the handle 370 is shown extending outward, perpendicular to the external surface 260 (FIG. 2) of the disk 203, however, the handle 370 can be positioned at one of many angles relative to the external surface 260 of the disk 203.

FIG. 5 illustrates a bottom view of the battery dispenser when the disk 203 is rotated away from the load position in a clockwise direction indicated by arrows 502. The key 240 of the grip ring 108 is no longer aligned with the opening 230 of the disk 203. In addition, the projection 380 from the edge of the disk 203 is no longer aligned with the notch 382 in the grip ring 108 as it is guided along circumferentially extending groove 384 (FIG. 3).

FIG. 6 shows the disk 203 rotated into the dispensing position. The projection 380 is in contact with the stop wall 386 of the extending groove 384 (FIG. 3) and further rotation of the disk 203 relative to the grip ring 108 in the same direction 502 (FIG. 5) is prevented. The angle of rotation a of the disk 203 from the load position to a dispensing position can vary, and can depend upon the number of battery positions on the base 320 of refill 204 (FIG. 3).

In the example embodiment shown in FIG. 3, there are eight battery positions 330 plus one empty battery position 332, all evenly spaced. The empty position 332, which is aligned with key 240 in the load position, is rotated along with the disk 203 and base 320 approximately 40 degrees relative to the grip ring 108, aligning the first battery location with the landing 106 in the dispensing position.

When the disk 203 is in the dispensing position, the dimple 405 (FIG. 4), which is spaced apart from the key 240 when the disk 203 is in the load position, interfaces with the protrusion 307 on the key 240 of the grip ring 108 to provide resistance against the disk 203 and maintain the disk 203 in place relative to the grip ring 108. That is, the protrusion 307 and dimple 405 can prevent the disk 203 from inadvertently rotating in a direction opposite that of arrows 502 and thereby causing the opening 230 to realign with the key 240 such that the disk can slip out of the grip ring 108.

In another embodiment the handle 370 of disk 203 cooperates with the grip ring 108 to restrict movement of the base 320 relative to the grip ring 108. When the disk 203 is rotated into the dispensing position, the handle 370 can be folded in against the grip ring 108, and a protrusion 375 of the handle 370 fits into the notch 382 of the grip ring 108, effectively locking the disk 203 into place so that the movement of the disk 203 and the refill base 320 coincide with the movement of the grip ring 108. Therefore, when the handle is folded in, the disk 203 and the grip ring 108 are locked as a unitary component, which thereby secures the refill 204 to the battery dispenser 100 while the battery dispenser 100 is manipulated to dispense batteries 112. The cover 102 and the grip ring 108 can be rotated relative to one another in both clockwise and counter-clockwise directions to dispense batteries.

In another embodiment, the disk 203 can be integral with the refill 204 as a single component. In such case at least one feature, or a combination of features, of the disk 203 described above can be incorporated into the base 320 of refill 204. For example the base can include a handle 370 and projection 380 that can fit into notch 382 of grip ring 108 and slide along groove 384.

FIG. 7 is an exploded view of the battery dispenser and refill according to another embodiment of the invention. Battery dispenser 700 can include several of the same features as described above with respect to battery dispenser 100 of FIGS. 1-3. Battery dispenser 700 includes cover 702, a push element 104, a landing 706, a grip ring 708, a refill 704 and a disk 703. The refill 704 which can include a base 720, an adhesive platform 322, a plurality of batteries 112, a retainer 724, and downward protrusions 752, 754, which can be mounted onto disk 703 via openings 761. The battery dispenser 700 can be opened and closed by rotating the disk 703 relative to the grip ring 708 about axis 710 from a load position to a dispensing position. When a refill 704 containing batteries 112 is inserted into the dispenser 700, the disk 703 and refill 704 are placed in the load position such that the horseshoe openings of the disk 703 and base 720 pass by key 740 of grip ring 708, and downward protrusions 752 and 754 of base 720 fit into openings 761 of disk 703. The user can rotate disk 703 by grasping handle 770 which extends outward from external surface 760 of disk 703. In an alternative embodiment disk 703 is integral with base 720, and therefore, refill 704 includes disk 703.

The disk 703 can cooperate with the grip ring 708 to restrict the rotation of the disk 703 relative to the grip ring 708 about axis 710 in the same manner as described above with respect to battery dispenser 100. From the load position the disk 703 can be rotated such that the projection 780 from the edge of the disk 703 slides within the circumferential groove 784 until the projection 780 comes into contact with stop wall 786 when disk 703 and base 720 are at the dispensing position.

In another embodiment of the present invention the cover 702 cooperates with the grip ring 708 to restrict rotation of the grip ring 708 relative to the cover 702. Grip ring 708 includes a finger 711, which is biased outward, away from axis 710, to interact with a plurality of ratchet cavities 790 along the inside surface 795 of cover 702. When grip ring 708 is rotated relative to cover 702 about axis 710, finger 711 springs into cavity 790 having a blunt wall 792 and a tapered wall 794. Once the finger 711 springs into a ratchet cavity 790 the blunt wall 792 imposes an interference surface against finger 711 and restricts rotation of the grip ring 708 relative to the cover 702 in one direction whereas the tapered wall 794 allows the finger 711 to move toward the next ratchet cavity 790. Once the refill 704 has been loaded and placed in a dispensing position, a restriction of the rotation of the grip ring 708 relative to the cover 702, to advance batteries 112 toward landing 706, can be desirable to help limit the movement of both the base 720 and the disk 703 relative to the grip ring 708. Thus, if the rotation of the grip ring 708 relative to the cover is at least partially restricted in one direction, the creep or slippage of the disk 703 and base 720 relative to the grip ring 708 can be minimized under circumstances that causes the movement of the disk 703 and base 720 to be forced in a direction that is toward the stop wall 786 of circumferential groove 784, as will be described below.

FIG. 8 shows a bottom view of dispenser 700 in which the refill 704 has been loaded and the disk 703 is rotated in a clockwise direction indicated by arrow 802 about axis 710 from a load position to a dispensing position. Projection 780 has moved away from notch 782 and the horseshoe opening 730 of the disk 703 is misaligned from the key 740 of the grip ring 708. Protrusion 707 (shown in phantom) of key 740 is in alignment with dimple 705 (shown in phantom) of disk 703 when disk 703 is in the dispensing position. The alignment of protrusion 707 and key 740 can help maintain the disk 703 in the same position relative to the grip ring 708 so that rotation of the refill 704 and the disk 703 coincide with the rotation of the grip ring 708. The angle of rotation, a, through which the disk 703 is rotated relative to the grip ring 708 in order to reach the dispensing position can vary. For example, battery dispenser 700, like battery dispenser 100, has eight battery positions and one empty battery position, and therefore the disk 703 is rotated about 40 degrees relative to the grip ring 708 to align a first battery position with the opening of cover 702 and landing 706. It should be understood, however, that the degree of rotation a of disk 703 that allows the projection 780 to reach stop wall 786 can vary in the alignment of any of the battery positions with landing 706.

FIG. 9 is a close-up cut-away bottom view of the dotted line portion of dispenser 700 shown in FIG. 8. The interaction between the ratchet cavities 790 of cover 702 and the finger 711 of grip ring 708 is illustrated. The presence of ratchet cavities 790 allows cover 702 and grip ring 708 to rotate freely about axis 710 (FIG. 7) in a first direction and restricts the rotation of the cover 702 relative to the grip ring 708 in a second direction, opposite the first direction. For example, the orientation of the ratchet cavities 790 (FIG. 7) is such that cover 702 is free to rotate in a direction indicated by arrow 903, e.g. clockwise as viewed from the bottom of the battery dispenser 702. The direction of rotation 903 of the cover 702 is opposite the relative direction of rotation 902 of the grip ring 708 to dispense batteries 112 from the dispenser. The direction 903 of rotation of the cover 702 is the same as the direction 802 (FIG. 8), in which rotation of the disk 703 causes disk 703 and base 720 to move from the load position to the dispensing position, and the relative direction of rotation 902 of the grip ring 708 is opposite the direction 802 (FIG. 8), in which rotation of the disk 703 causes disk 703 and base 720 to move from the load position to the dispensing position.

As the cover 702 is rotated along direction 903, relative to the grip ring 708, ratcheting finger 711 springs into a ratcheting cavity 790 where the end of the ratcheting finger 711 resides adjacent to blunt wall 792. Once so positioned, rotation of the cover 702 relative to the grip ring 708 is restricted in a direction opposite direction 903 due to the interface between finger 711 and blunt wall 792 of the ratcheting cavity 790. The ratcheting finger 711 can further include a protrusion, for example the half-moon protrusion 904, which mates with a contoured recess 906 along the ratcheting cavity 790 to provide a detent interaction between the ratcheting finger 711 and the ratcheting cavity 790 to help ensure the rotation can be stopped at the next cell position.

The rotation of the cover 702 in direction 903 and relative to the grip ring 708 allows the user to advance the next battery 112 into alignment with the landing 706. The interaction between finger 711 grip ring 708 and ratcheting cavities 790 of cover 702 restricts relative movement of the cover 702 and the grip ring 708 in the opposite direction. This interaction limits the degree of rotation that the grip ring 708 can rotate in a direction which is the same direction 802 that the disk 703 and base 720 are rotated to move them into the dispensing position. This therefore limits relative movement due to frictional forces between the disk 703 and the grip ring 708, when the grip ring 708 is rotated in direction 802 and that could cause the horseshoe-shaped opening of the disk 703 (FIGS. 7-8) to creep back to the key 740 of the grip ring 708 and cause the refill 704 (FIG. 7) to fall out of the dispenser 700.

Rotation of the cover 702 relative to the grip ring 708 can be restricted in one direction, however, rotation in two opposite directions is possible. For example, the user can rotate the grip ring 708 in a first direction 902 to an angle of rotation that is less than alpha, α, without engaging the next ratchet cavity 790. The user could thus rotate the grip ring 708 in a direction opposite 902 up to the original ratchet cavity 790. This would not dislodge a battery 112 or cause harm to the dispenser 700 if α is less than the angle of rotation necessary to advance to the next battery 112. The angle of rotation to which the cover 702 and grip ring 708 can be restricted relative to one another can vary. In the example embodiment shown in FIG. 9 the restriction is less than the angle of rotation alpha which coincides with the angle that is required for the extending wall 780 (FIG. 7) of disk 703 is rotated to contact the stop wall 786 (FIG. 7) of grip ring 708. As mentioned above, the restriction of the angle of rotation is less than about 40 degrees in the example embodiment shown in FIGS. 7-9, however, alternative angles less than about 360 degrees are possible.

Referring to FIG. 7 retainer 724 and base 720 differ from retainer 324 (FIG. 3) and base 320 (FIG. 3) are just two examples of retainers and bases that can be used. Retainer 724 includes a number of slot openings 750 to receive snap connectors 751 of the base 720 to connect the retainer 724 onto the base 720. The latching fit of the snap connectors 751 of base 720 through the slot openings 750 of the retainer 324 can place a compressive force on each of the batteries 112. In addition, the inside surfaces of the covers 102, 702 can include a flange, for example protrusion 753, that contacts the top of the retainer 724, or the tops of the batteries 112 if retainer 724 is not present. The protrusion 753 can help hold the batteries 112 level against the base 720 and provide a good seal between the bottom surface of the batteries 112 and the base 720, or between the batteries 112 and an adhesive platform 322 disposed on the base 720.

In another embodiment, the disk 703 can be integral with the refill 704 as a single component. In such case at least one feature, or a combination of features, of the disk 703 described above can be incorporated into the base 720 of refill 204. For example the base can include a handle 770 and projection 780 that can fit into notch 782 of grip ring 108 and slide along groove 784.

Figure 10:
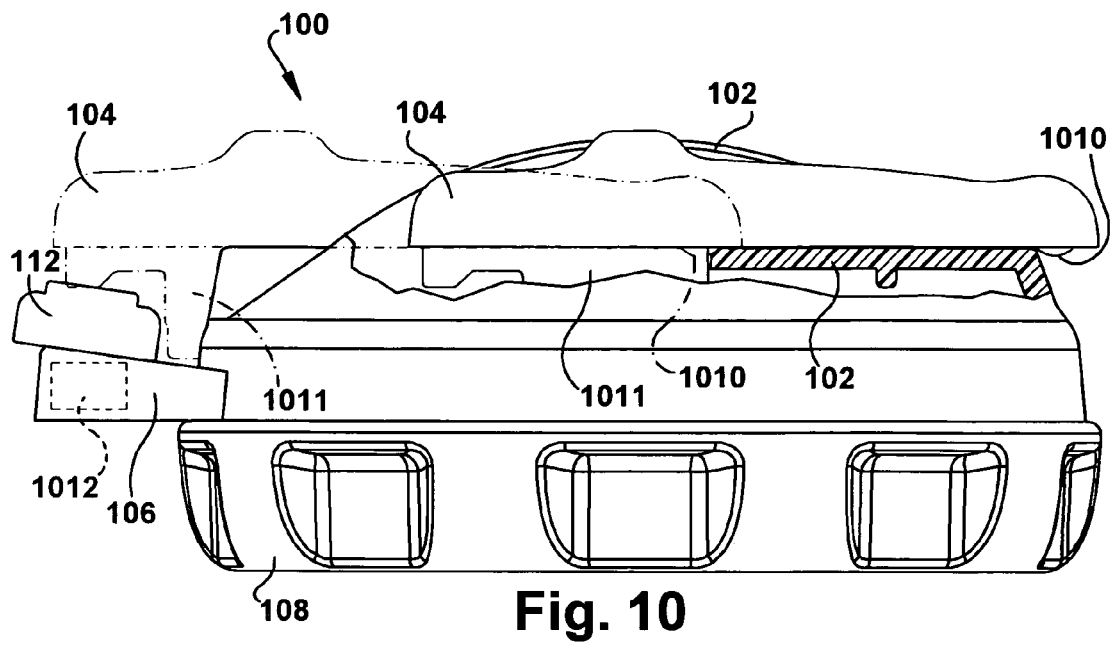
FIG. 10 is a side view of the battery dispenser of FIG. 1 showing the push element in the dispensing position and the closed position according to an embodiment of the invention.

FIG. 10 is a partial sectional side view of push element 104 of the battery dispenser 100 (FIGS. 1 and 2) showing the operation of the push element 104, according to an embodiment of the invention. The push element includes a rudder 1011 that extends downward to contact and advance a battery 112 from a battery position to the landing 106 during the dispensing operation. The push element 104, which occupies the empty battery position 332 (FIG. 3) after the refill 204 is initially loaded in the dispenser 100, is moved from the fully extended position (shown in phantom) to the fully retracted position (shown in solid), where a rudder 1011 of the push element 104 is inside the turret partition 328 (FIG. 3), so the cover 102 and grip ring 108 can be rotated with respect to each other about axis 210 (FIGS. 2-3) until a battery 112 is aligned with landing 106. The landing can also include a magnetic component 1012 (shown in phantom) that can aid in controlling and maintaining a battery 112 on the landing 106 during dispensing.

The rudder 1011 provides an interference side surface against the opening 302 (FIG. 3) of cover 102 to provide awareness to the user that the push element 104 is in the closed or fully extended position (shown in phantom). Similarly, when the push element 104 is in the open or fully retracted position, a nub 1010 protruding from the bottom rear surface of the push element 104 provides an interference surface against the outside of the cover 102 to retain the push element 104 in the fully retracted position and to indicate to the user that the cover 102 and grip ring 108 can be rotated relative to one another to position another battery 112 at the cover opening 302.

Figure 11:
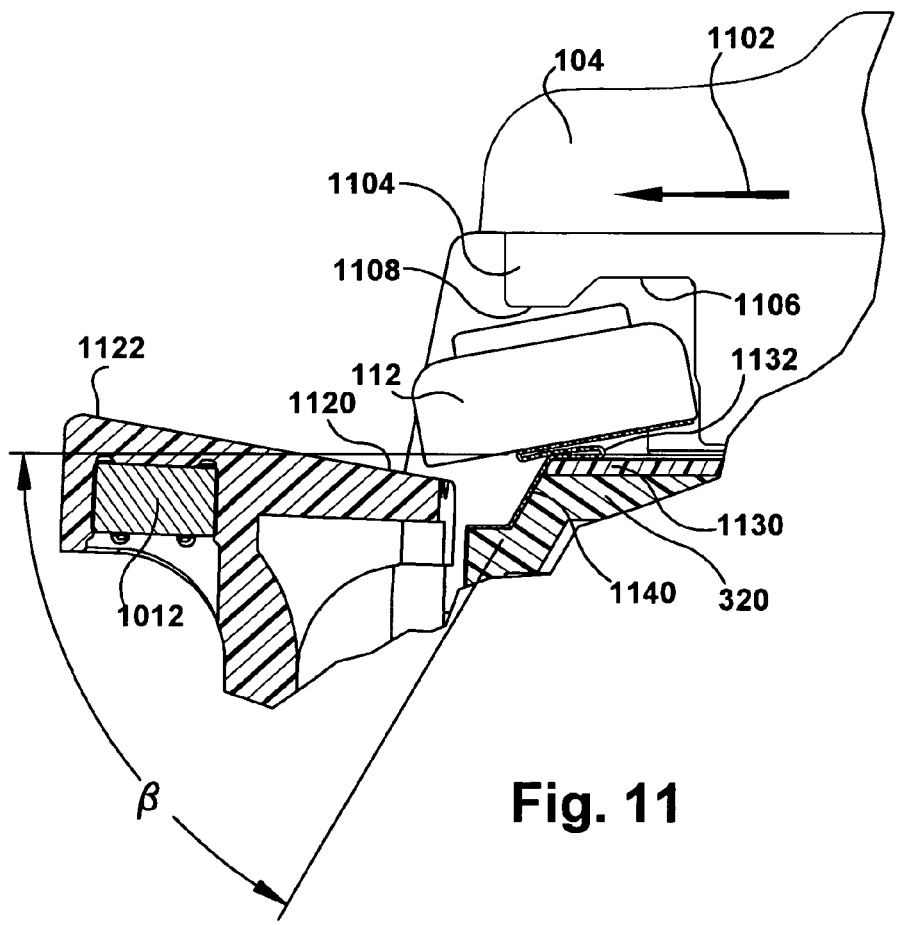
FIG. 11 is a partial sectional view of the battery dispenser of FIG. 10 showing a battery being released from the battery dispenser according to an embodiment of the invention.

FIG. 11 is a partial sectional view of battery dispenser 100 of FIG. 1 which shows a battery 112 being pushed by the push element 104 in the direction indicated by arrow 1102. The peripheral edge 1140 of the base 320 can be angled to facilitate removal of the batteries 112 from the adhesive platform 322 (FIG. 3). The angle β, between the peripheral edge 1140 of the base 320 and the deck 326 (FIG. 3) of the base, can range from greater than zero to about 90 degrees, or even greater. The force on the battery 112 by the extending push element 104 can cause the battery to tip as it reaches the peripheral edge 1140 of the base 320. Adhesive platform 322 may include a permanent adhesive system 1130 and a tab system 1132 disposed between the battery 112 and the permanent adhesive system 1130. As the battery 112 is pushed onto the landing 106, the tab system 1132 folds under the battery 112 in the direction opposite that of the battery displacement 1102.

The contour of the nose 1104 which has a bi-level upper 1106 and lower 1108 surfaces allows additional clearance for the battery 112 to tip as the battery 112 releases from the removable adhesive layer 1132. The tilted orientation of the battery 112 can facilitate a clean peeling of the battery 112 from the adhesive layer 1132, thereby preventing adhesive residue from adhering to the battery 112 after dispensing. The adhesive platform 322 is thereby mechanically separated from the battery 112 when the battery is advanced from the interior of the cover 102 to the landing 106, and meanwhile the adhesive platform 322 remains attached to the base.

FIG. 11 also shows that the top surface of the landing 106 can have a gradual incline from the proximal end 1120 to the distal end 1122 to a allow battery 112 to be wedged between the push element 104 and the landing 106 to better secure the battery. As mentioned above, a magnetic component 1012 can aid in controlling and maintaining a battery 112 on the landing 106. The landing 106 can optionally include a ribbed portion 303 (FIG. 3), or an alternative profile, that reduces the surface area contacted by an adhesive layer of the tab system 1132 when it folds under the battery 112 during dispensing. The reduced surface area of the ribbed portion 303 can therefore help prevent the tab system 1132 from adhering to the landing 106.

The components of the battery dispenser and refill in the example embodiments described above can be made of any suitable durable material, for example, thermoplastic materials including but not limited to polycarbonate, acrylonitrile butadiene styrene (ABS), nylon, polyethylene, polypropylene, and polystyrene. The cover 102, 702 can be a transparent or translucent material, for example, polycarbonate or acrylic, which allows the user to readily see the contents of the battery dispenser. A suitable polycarbonate material is LEXAN® 143R resin manufactured by G.E. Plastics and available from Polymer Land Service Center, Pittsburgh, Pa., USA. The push element 104 can be molded from a polystyrene material such as STYRON® 6075, manufactured by Dow Plastics and available from General Polymers, Columbus, Ohio, USA.

Tab system 1132 includes at least one layer of a polymer film that can control the diffusion of oxygen and vapor through air entry ports of the batteries 112, and a removable adhesive layer disposed on the polymer film to hold the batteries 112 to the polymer film.

The permanent adhesive system 1130 includes a permanent adhesive that secures the tab system 1132 to the base 320 (FIG. 3). The permanent adhesive can be printed in a pattern that includes only a small area within the die cuts 336 (FIG. 3) so the areas of the adhesive platform 322 within the die cuts 336 are held to the base 320 prior to dispensing the batteries 112 and yet allow easy peeling of the tab layer 1130 from the batteries 112 during dispensing. A suitable material for the tab system 1132 which includes, for example, a polymer layer and a removable acrylic adhesive layer applied thereto, is FASSON® PRIMAX® 350 with R143 adhesive, available from Avery Dennison, Fasson Roll North America of Painesville, Ohio, USA. A suitable permanent adhesive of permanent adhesive system 1130 is an acrylic adhesive available from Schreiner ProTech, a division of Schreiner GmbH & Co. KG, Oberschleissheim, Germany. In another embodiment the permanent adhesive system 1130 can be a laminate having a resilient layer, for example foam or a gasket, that has a permanent adhesive on both sides and can be adhered to base 320.

Although the invention is shown and described with respect to certain embodiments, it is obvious that equivalents and modifications will occur to others skilled in the art upon the reading and understanding of the specification. For example, there are several alternative devices and methods by which the disk 203, 703 (FIGS. 3 and 7) can be locked with the grip ring 107, 708 (FIGS. 3 and 7) for the movement of the base 320, 720 and grip ring 108, 708 to coincide. There may also be several alternative devices and methods by which the base 203, 703 of the refill 204, 704 can be locked with the grip ring 108, 708 for the movement of the base 203, 703 and grip ring 108, 708 to coincide. For example, an alternative locking feature could be a separate component or plurality of components that engage and disengage the disk 203, 703 and the grip ring 108, 708, and the base 203, 703 and the grip ring 108, 708. An alternative method can require the user to take another step during the refill loading and unloading process. The present invention includes all such equivalents and modifications, and is limited only by the scope of the claims.

What is claimed is:

1. A battery dispenser for dispensing batteries, the battery dispenser comprising:
   a cover comprising an opening;
   a landing disposed external to the cover; and
   a push element for advancing the batteries through the opening of the cover to the landing;
   a grip ring that rotates about an axis relative to the cover;
   a disk that rotates relative to the grip ring about the axis between a load position and a dispensing position; and
   wherein the disk is removable from the grip ring to open the dispenser and insertable within the grip ring to close the dispenser when the disk is in the load position.

2. The battery dispenser of claim 1, wherein the grip ring has a key that aligns with an opening of the disk when the disk is in the load position:

3. The battery dispenser of claim 2, wherein the key of the grip ring is misaligned with the opening of the disk when the disk is in the dispensing position.

4. The battery dispenser of claim 1, wherein the disk and the grip ring cooperate to restrict rotation of the disk about the axis relative to the grip ring when the disk is in the dispensing position.

5. The battery dispenser of claim 4, wherein:
   the grip ring comprises a recess that defines a circumferentially extending groove;
   the disk comprises a projection that slides within the groove when the disk is moved between the load position and the dispensing position; and
   the circumferentially extending groove comprises a stop that is contacted by the projection of the disk when the dispenser is in the dispensing position.

6. The battery dispenser of claim 1, wherein rotation of the disk about the axis coincides with the rotation of the grip ring when the disk is in the dispensing position.

7. The battery dispenser of claim 2, wherein the grip ring defines a circumferential ledge and the disk is disposed between the ledge and the key of the grip ring.

8. The battery dispenser of claim 1, wherein the disk comprises a handle that is movable relative to an external surface of the disk between a locked position and an unlocked position.

9. The battery dispenser of claim 8, wherein the handle cooperates with the grip ring to limit the rotation of the disk about the axis relative to the grip ring.

10. The battery dispenser of claim 9, wherein the handle comprises a protrusion that is disposed within a recess of the grip ring when the handle is in the locked position.

11. The battery dispenser of claim 8, wherein the handle is in the locked position when the disk is in the dispensing position.

12. The battery dispenser of claim 8, wherein the position of the handle relative to the external surface of the disk can be at an angle that ranges from zero to 90 degrees.

13. The battery dispenser of claim 8, wherein the cover is free to rotate about the axis relative to the grip ring in a first direction and in a second direction that is opposite the first direction.

14. The battery dispenser of claim 1, wherein the disk comprises a handle that is stationary relative to an external surface of the disk.

15. The battery dispenser of claim 1, wherein the push element is moveable between a retracted and an extended position, and the grip ring and cover can rotate with respect to one another only when the push element is in the retracted position.

16. The battery dispenser of claim 15, wherein the cover rotates relative to the grip ring about the axis, and rotation is unrestricted in a first direction and rotation is restricted in a second direction that is opposite the first direction.

17. The battery dispenser of claim 16, wherein the grip ring comprises a ratcheting finger and the cover comprises a ratcheting cavity that receives the ratcheting finger.

18. The battery dispenser of claim 17, wherein the ratcheting finger is prevented from moving from a first ratcheting cavity in the cover to a second ratcheting cavity in the cover when the cover is rotated relative to the grip ring in the second direction.

19. The battery dispenser of claim 18, wherein the disk comprises a handle. extending therefrom for rotating the disk about the axis.

20. The battery dispenser of claim 19, wherein the handle has a serpentine shape.

21. The battery dispenser of claim 1, wherein the peripheral edge of the disk comprises a detent.

22. The battery dispenser of claim 1, wherein the disk further comprises a snap connect to latch to a refill comprising batteries.

23. The battery dispenser of claim 1, wherein the disk further comprises an opening to receive a protrusion of a refill.

24. The battery dispenser of claim 1, wherein the dispenser further comprises a refill, the refill comprising:
   a plurality of batteries;
   a base that supports the plurality of batteries at a plurality of battery positions;
   a retainer in physical communication with the base; and
   wherein the base compnses an opening to mate with a key of the dispenser.

25. The battery dispenser of claim 24, wherein the base comprises a projection that extends radially from its periphery to interface with the dispenser.

26. The battery dispenser of claim 24, wherein the base comprises a handle on a surface of the base opposite a surface of the base that supports the plurality of batteries.

27. The battery dispenser of claim 24, wherein the base comprises a deck that supports the batteries and a post that protrudes outward from a surface of the base opposite the deck.

28. The battery dispenser of claim 27, wherein the base comprises an adhesive platform between the deck and the batteries.

29. The battery dispenser of claim 28, wherein:
   the base comprises a plurality of battery positions and an empty position; and
   a portion of the adhesive platform is pre-cut at each of a plurality of battery positions.

30. The battery dispenser of claim 24, wherein the base comprises a leg that extends through an opening of the retainer.

31. The battery dispenser of claim 24, wherein the retainer applies a compressive force against the plurality of batteries.

32. The battery dispenser of claim 24, wherein the batteries are button metal-air cells.

* * * * *